United States Patent [19]
Verhille
[11] 3,932,751
[45] Jan. 13, 1976

[54] FORMATION OF ELECTROSTATIC CHARGE PATTERNS

[75] Inventor: Karel Eugeen Verhille, Hoboken, Belgium
[73] Assignee: AGFA-GEVAERT N.V., Mortsel, Belgium

[22] Filed: Nov. 30, 1973
[21] Appl. No.: 420,561

[30] Foreign Application Priority Data

Dec. 1, 1972 United Kingdom ............... 55693/72
July 5, 1973 United Kingdom ............... 32007/73

[52] U.S. Cl. ............ 250/315; 250/324; 346/74 EB; 346/74 ES
[51] Int. Cl. ........................................... G01d 15/06
[58] Field of Search ......... 250/213 VT, 315, 315 A, 250/324, 325, 326; 346/74 CR, 74 ES, 74 EB; 355/3 R, 17

[56] References Cited
UNITED STATES PATENTS

| | | | |
|---|---|---|---|
| 2,965,481 | 12/1960 | Gundlach | 250/325 |
| 3,001,849 | 9/1961 | Walkup | 250/315 |
| 3,041,611 | 6/1962 | Moss | 346/74 |
| 3,508,477 | 4/1970 | Groo | 250/315 |
| 3,576,583 | 4/1971 | Uno | 346/74 |
| 3,757,351 | 9/1973 | Simms | 346/74 |
| 3,774,029 | 11/1973 | Muntz et al. | 250/315 |

*Primary Examiner*—James W. Lawrence
*Assistant Examiner*—B. C. Anderson
*Attorney, Agent, or Firm*—William J. Daniel

[57] ABSTRACT

A method of recording an electrostatic charge image or pattern representing information to be recorded, such discharge pattern being generated in the interior of an envelope or chamber comprising as a portion of its wall a dielectric target towards which the charges are projected, characterised in that a corresponding electrostatic charge image is produced externally of the envelope on the exterior surface of the dielectric target by projecting such charges against the target while the exterior surface of the target is electrostatically charged with charges of a polarity opposite to the interior charge pattern or is being exposed to such opposite charging from an external charging source. Optionally, a separate dielectric material is arranged outside the chamber in contact with the exterior target surface and the external charge pattern is produced on the separate dielectric material which can be removed.

16 Claims, 7 Drawing Figures

Figure 1:
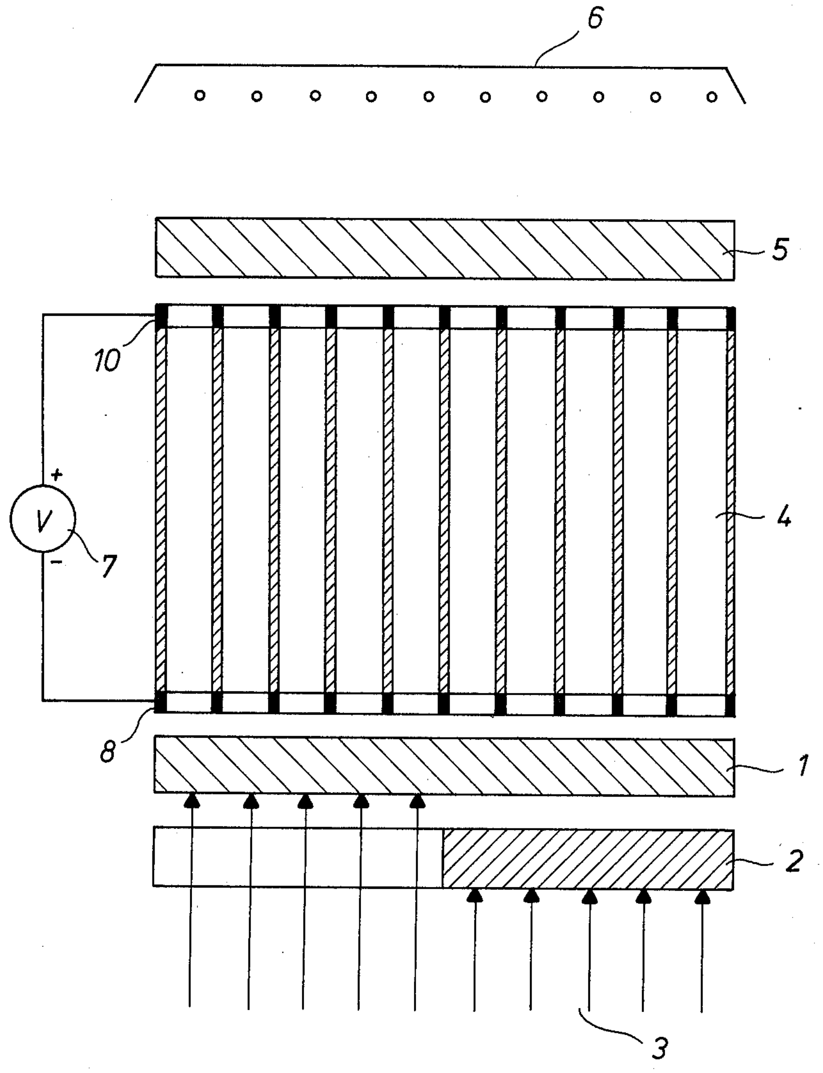

Fig. 4
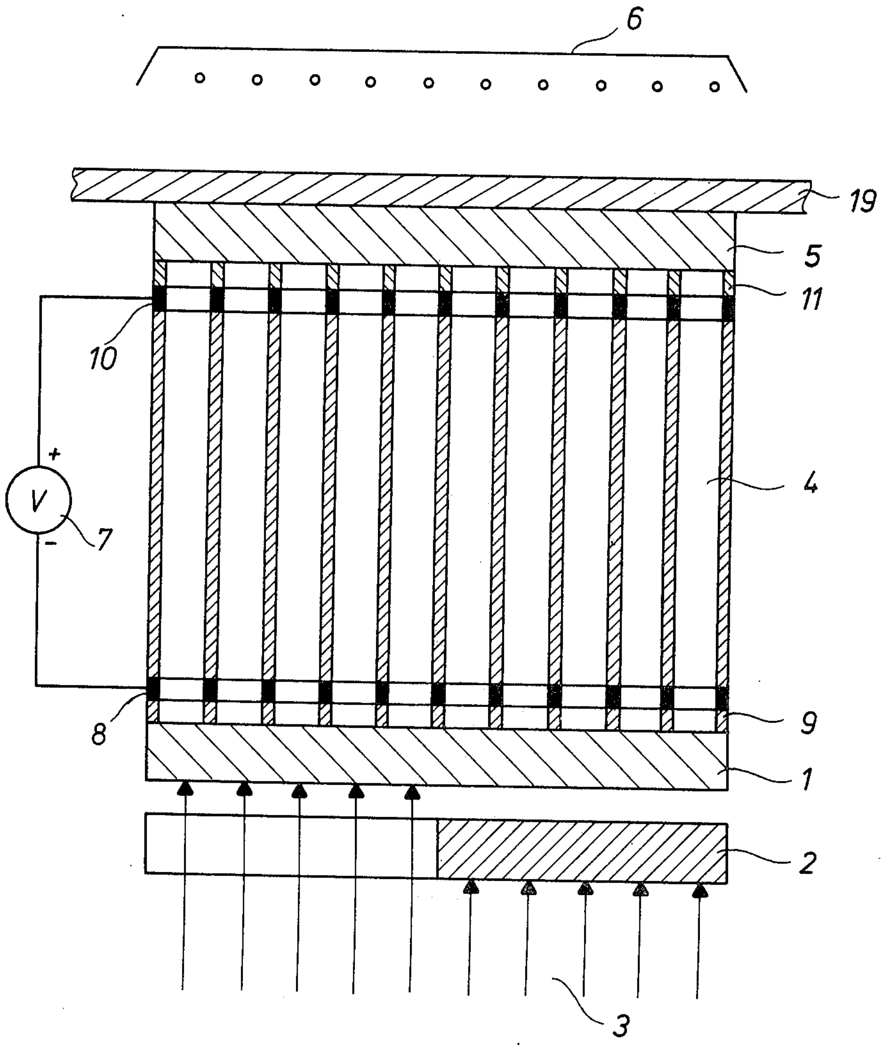
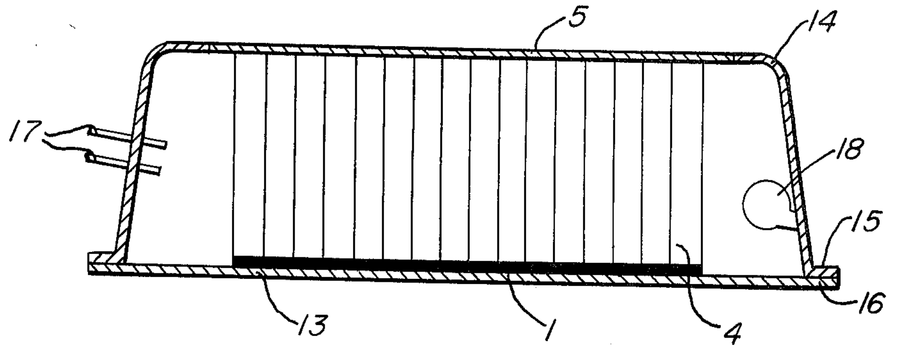
FIG. 5

FORMATION OF ELECTROSTATIC CHARGE PATTERNS

This invention relates to the formation of electrostatic charge patterns upon a substrate and devices for producing such patterns.

An important technique in the production of photographic images is known as electrophotography. In electrophotography a visible image of the information or original to be recorded and reproduced is formed by first uniformly charging and then exposing a photoconductive insulating material to a light pattern. The electrostatic image remaining in the unexposed or insufficiently exposed areas of the photoconductive material is developed with an electrostatically attractable material, which is fixed directly on the photoconductive material or transferred to a receiving material on which it is fixed to form a permanent image print.

From the German Patent No. 1,497,093 filed Nov. 8, 1962 by Siemens A. G. an imaging technique is known in which a photocathode is used to produce an electrostatic charge pattern on a non-photosensitive insulating material. In this technique an air-tight chamber is filled with an ionizable gas, e.g. a mixture of argon and monobromotrifluoromethane (1:5), and is provided with a photocathode and an anode, the latter being covered by an insulating recording material, e.g. an insulating resin sheet. Simultaneously with an object-wise X-ray exposure, modulated by the object being X-rays, a direct current potential is applied across the electrodes so that photoelectrons, which are ejected image-wise from the photocathode, are strongly intensified by an avalanching process in the ionizable gas. The electrons are collected on the insulating material in an image pattern corresponding to the intensity of the imaging radiation absorbed in the photocathode.

It is apparent that the above described technique, although advantageous for high electron multiplication, is less attractive because each printing operation requires the opening of the air-tight chamber and the air entering the opened chamber must be replaced by a special ionizable gas composition at a well-defined pressure.

The present invention aims to provide a method for recording an electron image as an electrostatic charge pattern, which can be utilized much more easily for the production of readable copies of the transmitted information.

According to the present invention, a method of recording an electrostatic charge image or pattern ions representing an envelope or chamber including as a portion of the wall thereof a dielectric target towards which the charges are projected, is characterised in that a corresponding electrostatic charge image is produced externally of the envelope on the exterior surface of the dielectric target, or optionally the exterior surface of a separate dielectric material, in exterior contact with the target, by projecting the internal charge pattern against the target while such external surface is electrostatically charged with a polarity opposite to the internal charge pattern is being exposed to such opposite electrostatic charging from an external charging source, such as a corona.

The method can be used not only for producing copies of information represented by graphic matter, but also for recording information transmitted in the form of information-wise modulated electrical or other signals.

The electrostatic charge pattern can be developed on the surface on which it is formed, e.g., using development techniques commonly used in the xerographic art or can be transferred to, or used for inducing a corresponding or inverted charge pattern in, another insulating surface. Techniques for transferring or reproducing charge patterns one from another are also well known in the xerographic art.

The charge pattern can be produced in various ways. For example use can be made of an information-wise modulated scanning electron beam which is projected either directly against the target or onto a source of secondary electron emission from which a pattern of secondary electrons is projected onto the target. In other words, use may be made of a cathode ray type unit comprising an exposed dielectric target plate on which the electrostatic charge pattern can be produced and developed directly or alternatively, which may be arranged in contact with a separate dielectric plate in which the electrostatic charge pattern is induced by subjecting such separate plate to external electrostatic charging while the cathode ray beam is being projected on the target plate. Particulars about cathode-ray tubes useful in electrostatic recording are disclosed in the U.S. Pat. No. 2,200,741 of Frank Gray issued May 14, 1940, in J.Appl.Phys. Vol. 30; December 1959, pp. 1870–1873 and in Electr.Eng., June 1961, pp. 439–442.

As an alternative to the use of an information-wise modulated electron beam, the charge pattern may be produced by means of a photo-electron emissive member or medium, e.g. a photo-electron-emitting gas or photocathode or photocathode system, by information-wise exposing such member or medium to a pattern of radiant energy representing the information to be recorded thereby to cause electrons to be projected either directly against the target or onto a source of secondary electron emission from which secondary electrons forming the charge pattern are projected onto the target.

An X-ray recording technique wherein a solid photocathode is used is described, e.g., in the U.S. Pat. Nos. 2,221,776 of Chester F. Carlson issued Nov. 19, 1940 and 3,526,767 of Walter Roth and Alex F. Jvirblis issued Sept. 1, 1970, the United Kingdom Pat. No. 778,330 filed Apr. 15, 1955 by Cie. Franc.Thomson-Houston, the German Pat. No. 1,497,093 filed Nov. 8, 1962 by Siemens A. G., and the published German Patent Application Nos. 2,231,954 filed June 29, 1972 and 2,233,538 filed July 7, 1972 both by Diagnostic Instruments.

An X-ray recording technique using a gas such as xenon, which absorbs X-rays and produces photo-electrons and positive ions under a pressure above atmospheric pressure is described, e.g. in the Belgian Pat. No. 792,334 filed Dec. 6, 1972 by Xonics Inc., corresponding to U.S. Pat. No. 3,774,029.

In general it is envisaged that the production of the electrostatic charge pattern will be dependent on the deposition on an insulating target of electrons projected directly from a photo-electron emitter or cathode or from a source of secondary electron emission bombarded with such directly projected electrons. However, in certain cases the electrostatic charge pattern can be built up by the deposition of positive ions formed through ionization in an electrical discharge in a gas present under atmospheric or above atmospheric pressure in the aforesaid envelope. The discharge in the gas may be the result of an image-wise X-ray exposure as described in the Belgian Pat. No. 792,334 as mentioned above.

If the information is transmitted in the form of an information-wise distributed electron discharge pattern of sufficient intensity from a cathode or photocathode structure, this discharge can be directly used as the electron image projected onto the target. However, particular attention is presently given to embodiments of the invention in which an initial information-wise distributed electron discharge pattern is multiplied to produce an electron image of greater intensity.

Various types of amplifiers or multipliers may be used, with or without the interposition of an electron optical system for focusing and/or accelerating the primary electrons onto the multiplier.

As an example of a suitable type of intensifier, use can be made of a component comprising a material having the property of multiplying secondary electrons by transmission. Such a property according to the U.S. Pat. No. 3,660,668 of Adolph J. Wolski issued May 2, 1972 is exhibited by various materials, e.g., zinc sulphide, potassium chloride, potassium bromide, magnesium fluoride and calcium fluoride. When electrons impinge upon the surface of a layer of such a material with a velocity exceeding a certain minimum value, the electrons penetrate the layer and produce secondary electrons greater in number than the impinging electrons.

Another type of intensifier which can be used is a so-called channel multiplier of intensifier in which incident electrons are accelerated under the influence of an electric field and undergo multiplication on impact against the walls of the channel. In certain cases a channel intensifier can be constructed so as to incorporate a photocathode, in which case the intensifier can be directly exposed to a light image to generate photoelectrons which are then subject to multiplication in the intensifier. Various image intensifiers of this kind and methods of producing them are described in United Kingdom Pat. Nos. 1,064,072 filed Jan. 3, 1964, 1,064,072 filed Dec. 6, 1963, 1,064,074 filed Dec. 6, 1963 and 1,064,075 filed Apr. 7, 1964 all by Mullard Ltd.

Indeed, in certain preferred embodiments of the invention, a photocathode is information-wise irradiated to produces a pattern to photoelectrons which are introduced into an electron-multiplying device including a plurality of electron-multiplying narrow passages (microchannels) that are arranged in substantially parallel relationship in a vacuum or reduced pressure atmosphere in which the electrons are accelerated in an electric field and, by their interaction with the inner coating material of the microchannels or bulk material of the microchannels, are multiplied by secondary emission. The secondarily emitted electrons are ejected from these passages onto a dielectric material or target to form an electrostatic charge pattern on the interior surface of the target inside the reduced pressure atmosphere. Simultaneously, with the production of this charge pattern, a positive corona discharge is directed onto the exterior side of the dielectric target or, optionally, onto the exterior side of a separate dielectric material removably contacting the dielectric target which carries the interior electron charge pattern on its inner side, thereby producing a positive charge pattern on the outer side of the dielectric target or optionally on the exterior side of the separate dielectric material.

Very interesting results can be obtained by combining a secondary electron transmission multiplication material as aforesaid, with a channel intensifier, e.g., as described in U.S. Pat. No. 3,660,668 as mentioned above.

It will be evident that the method according to the invention affords important potential advantages in the field of information recording, e.g., in the recording of graphic information. The method lends itself to rapid repetitive operation, since there is no need for repeatedly filling the chamber with an ionizable gas as is required in the prior proposed method mentioned above.

In order that the method shall be rapidly repeatable, the target material should preferably be so composed that it can be made electrically conductive by uniform irradiation with electromagnetic radiation or by uniform phononexcitation (effecting molecular and/or atomic vibration), e.g., using infra-red radiation. In the case that the target forms part of a photocathode ray device, it should be possible to render the target conductive without the necessity for it to be irradiated with electromagnetic radiation of a wavelength to which the photocathode is sensitive.

The invention also includes apparatus suitable for performing the method according to the invention as hereinbefore defined.

The basic elements of one recording apparatus of the present invention and the steps of the related recording method are illustrated by the accompanying schematic drawings wherein FIG. 1 is a cross-sectional representation of a recording system structure of the present invention, FIGS. 2 to 4 and 6 and 7 are cross-sectional representations of alternative imaging structures and FIG. 5 is an illustration of one way for enclosing a recording device according to the present invention in a vacuum envelope.

It should be understood that in these figures some dimensions of the layers, photocathode, microchannel plate, etc., have been greatly exaggerated to show the details of construction. No inferences should be drawn as to the relative dimensions of the layers or of the distances separating the various elemental parts of the imaging apparatus.

Referrring to FIG. 1 the imaging apparatus comprises a photocathode 1, a microchannel plate 4, a dielectric charge receiving member 5 or insulating target whose exterior side is exposed the ambient atmosphere. The inner side of the photocathode 1 and the inner side of the electron-charge receiving dielectric member 5 directed to the microchannel plate 4 are in contact with a vacuum or reduced pressure atmosphere. The vacuum or reduced pressure atmosphere is maintained in an air-tight envelope or chamber of the type encountered e.g., in electronic tubes and other gas-filled or vacuum devices, with the proviso that the photocathode 1 has to be arranged in the chamber in such a way that it can be exposed to information-wise modulated activating radiation producing photo- and/or secondary emission electrons. Supporting members and envelope walls are not shown in FIG. 1.

According to the embodiment represented in FIG. 1, photoelectrons are image-wise generated in the photocathode 1 by exposure to an original or object 2, e.g. a silver image transparency or step wedge irradiated with electromagnetic radiation 3.

During and/or after the information-wise photoexposure of the photocathode 1, the charge-receiving dielectric member 5 is subjected to a corona charging originating from an optionally movable corona charge source 6 that projects onto the outer wall of the dielectric member 5 positive charges modulated in density according to the negative charges received from the direction of the photocathode 1.

During the information-wise exposure of the photocathode a DC-potential difference is applied between the upper and the lower ends of the microchannel plate 4. These ends are covered (e.g. by vapour-deposition) without closing the openings of the individual microchannels with electroconductive layers 8 and 10 between which a DC-potential source 7 is connected with the minus pole to the conductive layer 8, facing the photocathode 1, and with the plus pole to the conductive layer 10, which is directed to the dielectric layer 5.

The conductive layers 8 and 10 may be covered with an insulating layer not shown in FIG. 1.

Figure 2:
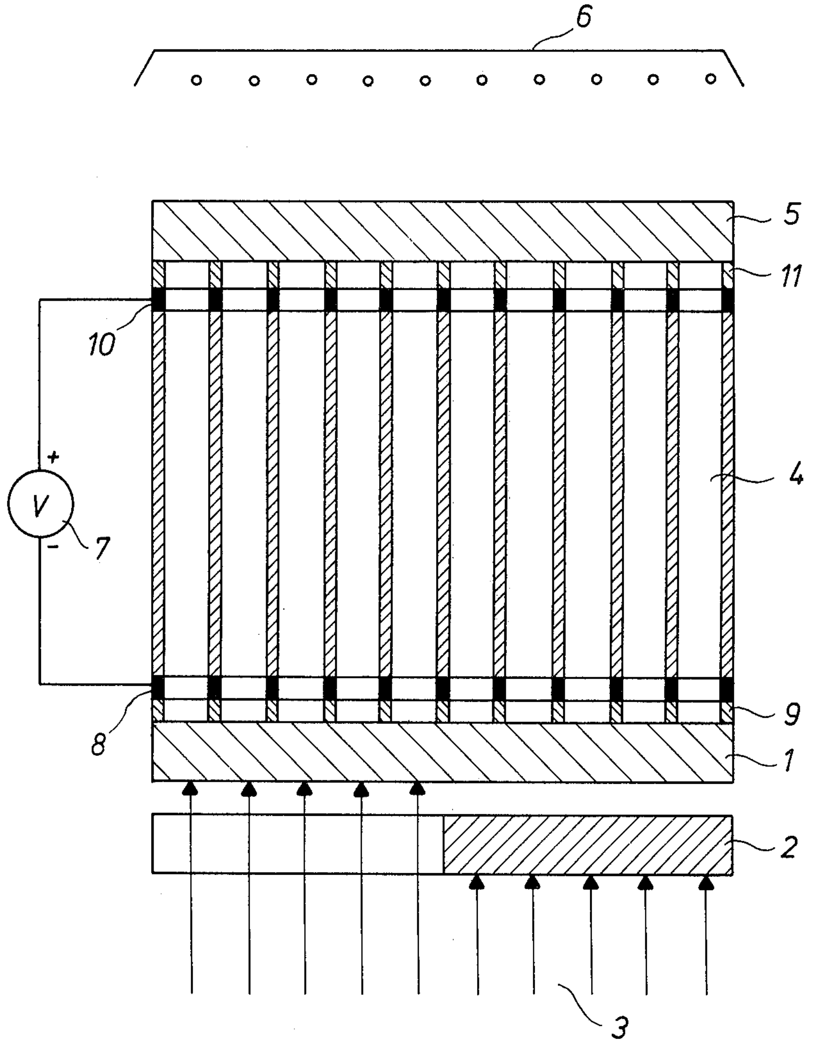

FIG. 2 represents a modified embodiment of the device of FIG. 1 wherein the microchannel plate 4 having conductive layers 8 and 10 is bonded to the photocathode 1 and the dielectric member 5 through electrically insulating layers 9 and 11 respectively. The layers 9 and 11 are composed of, e.g., insulating silicon monoxide or dioxide, which may be applied according to techniques known in the production of micro-electronic circuits (integrated circuits).

Figure 3:
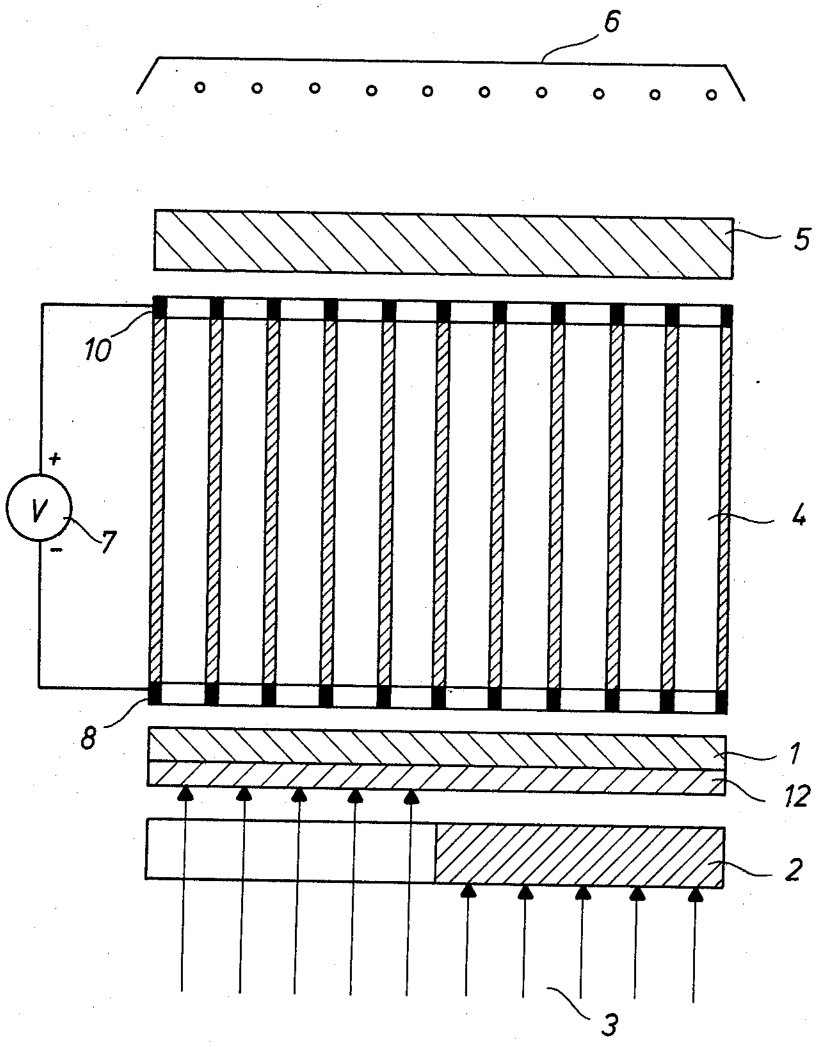

FIG. 3 represents another modified embodiment of the device of FIG. 1. In this device a photo-cathode 1, which is sensitive to ultraviolet radiation and/or visible light is covered with a fluorescent coating 12 in which substances are incorporated emitting ultraviolet radiation and/or visible light under the influence of an X-ray irradiation 3.

FIG. 4 represents a device operating as represented in FIG. 2 with the difference, however, that during the image-wise exposure of the photocathode the dielectric member 5 is held in contact with a separatable electrically polarizable insulating member 19 onto which the corona-discharge is directed. The electrostatic charge image is developed and optionally fixed on the separatable member 19, which may have the form of a flexible sheet or tape. According to this embodiment direct contact of developer material with the dielectric member 5 of the device is excluded and smudging of the dielectric member 5 with developer material is prevented.

FIG. 5 illustrates how a recording device according to the present invention may be enclosed in a vacuum envelope.

The photocathode layer 1 is directly coated by techniques known in the art onto the upper surface of a ground and polished glass plate 13.

The assembly of the microchannel plate 4 in intimate contact between the photocathode 1 and the dielectric member 5 as represented in FIG. 5 takes place under vacuum conditions. Under these conditions the microchannel plate 4 is positioned on the photocathode layer 1 and a glass cover 14, which is in the form of an inverted deep dish and contains the dielectric member 5, is placed over the microchannel plate 4. It should be noted that for the sake of clarity neither the electroconductive layers 8 and 10 nor the insulating layers 9 and 11 in accordance with FIG. 2 have been shown in the FIG. 5. The sealing of the device proceeds under vacuum conditions, e.g. by pressure welding, electron-beam welding or laser-beam welding of the rims 15 and 16 of the glass cover 14 and glass plate 13 respectively.

The production of the microchannel plate 4 as conceived for the use in electron multiplier tubes is restricted to plates of rather limited dimensions, having a plate diameter of e.g. 53 mm. Larger area plates are obtained by juxtaposition of single polygonal plate units by known production techniques which include the steps of cutting, grinding, polishing, and sealing of the polygonal, e.g. hexagonal, plate units in juxtaposition. The envelope may contain a getter as indicated by numeral 18, which may be activated for bonding gas molecules remaining in the envelope.

Connecting pins 17 permit electric connection to be made with the conductive layers at the upper and lower extremity of the microchannel plate 4.

It has been established that the development of the charge pattern on the outer side of the dielectric material (i.e. the external charge pattern) proceeds particularly well when during the supply of electrostatically attractable developing material to the outer side the charges of the electrostatic charge pattern inside the envelope are allowed to leak off.

For that purpose according to one embodiment of the present invention the target received the internal charge pattern is made of a so-called "double layer" of two photoconductive insulating layers of different spectral sensitivity that stand in intimate contact or are sealed together.

During the formation of the internal and external charge pattern both photoconductive layers should be kept in insulating condition. During the development of the external charge pattern with an electrostatically attractable, that the photoconductive layer facing the inner side of the envelope is connected to ground and is overall irradiated simultaneously with electromagnetic radiation of a wavelength that increases its conductivity without substantially increasing the conductivity of the other photoconductive layer carrying the external charge pattern.

After transfer of the image-wise deposited electrostatically attractable material from the photoconductive layer carrying the external charge pattern to a receiving material, e.g. plain paper or resin film material, the residual external charge pattern is removed by overall exposing the last mentioned photoconductive layer to electromagnetic radiation increasing its conductivity while connecting it to the ground to allow the remaining charges to leak off.

Only when both the internal and external charge pattern on the target are removed is a new discharge pattern, e.g. electron discharge pattern, formed in the imaging envelope and used for producing a new external charge pattern.

The photoconductive layers forming the double layer may be made of two photoconductive chalcogenide glass sheets or films of different spectral sensitivity that are fused together directly. This double layer forms part of the wall of the imaging envelope or chamber and should thus have a thickness giving the required mechanical strength for maintaining reduced pressure conditions in the envelope.

It has been established further that a developed image of improved sharpness and of better conformity with the original is obtained when in the embodiment using the corona discharge for producing the external charge pattern the charging of the external face of the target proceeds in the presence of a grid placed between the corona discharge-producing means and the external face. The ion sources including corona discharge electrodes may be in the form of needles or wires as well known in the art and any of these may be used in the present invention.

According to a particular embodiment a corona discharge apparatus is used in which the corona wires are kept at a positive potential of 6 kV with respect to the ground and wherein the grid wires are kept at a positive potential of +800 V with respect to ground. The electric field in the screen openings of the grid that are parallel with the target counteract the lateral diffusion of the ions of the corona. In order to avoid the reproduction of the screen pattern of the grid on the target the grid is kept moving parallel to the target during the corona charging.

The term "grid" as used in the present description is intended to encompass any and all electrode configurations that allow for the passage of ions therethrough; the term "grid" thus encompasses such constructions as are also known by the terms "screen", "mesh", "perforated plate" or "slot".

When a conductive grid is used, a part of the ions is attracted to that grid at a lower potential and is removed from the flow of ions. When a non-conductive grid or conductive grid coated with an insulating material, e.g. insulating resin, is used, the ions first build up a surface charge on the insulating surface of the grid and partially repel the ions passing through the central part of the openings of the grid. The coating of the grid may be photoconductive so that the charges built up on the grid during the formation of the external charge pattern after the formation of said pattern can be allowed to leak off by overall photo-exposing the grid while connected to ground.

According to one embodiment of the present invention the grid is made of crossing metal wires forming a line screen pattern. Alternative grid constructions can be formed by etching or electroforming e.g. are in the form of a perforated metal plate. The openings or holes in the grid are preferably in the order of 2 to 20 lines per millimeter.

Figure 6:
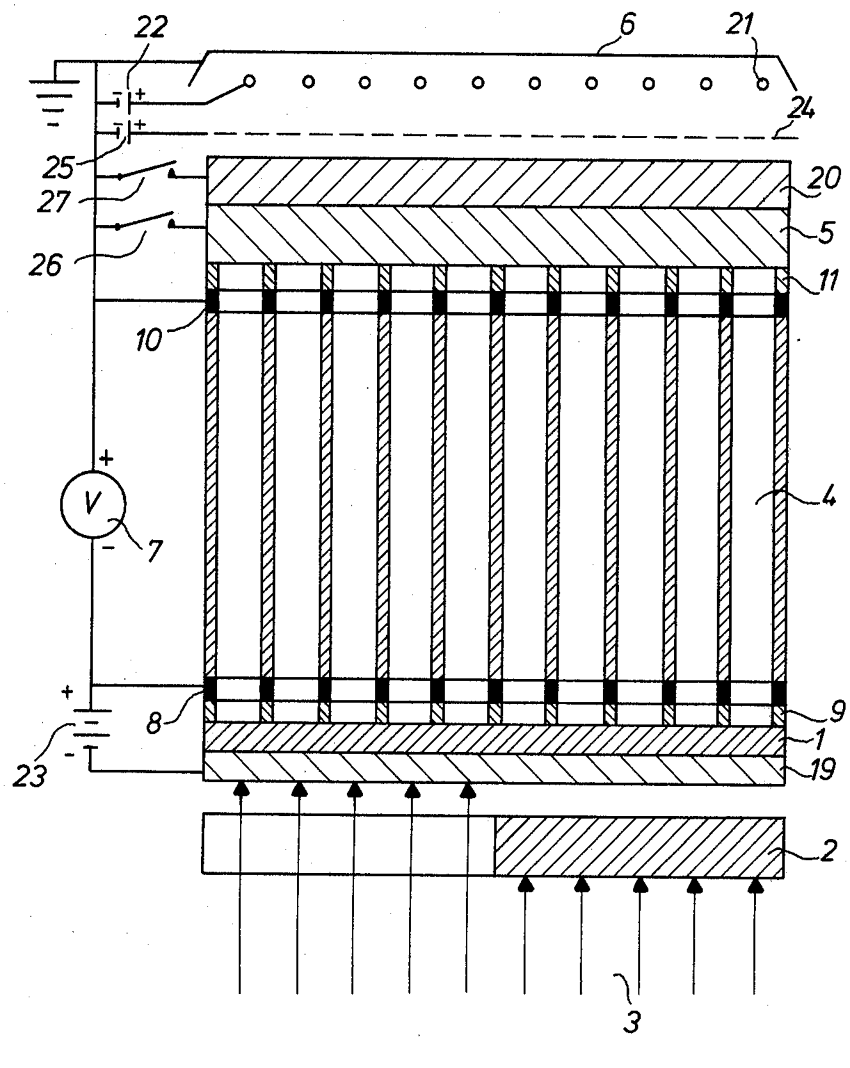

A device suited for use according to the present invention containing the photoconductive double layer and the grid for improving the image quality is represented in FIG. 6.

According to FIG. 6, the imaging apparatus comprises a photocathode 1 applied to an electrode 19 that is transparent for the electromagnetic radiation 3 used in the reproduction of the original 2. The microchannel plate 4 has conductive layers 8 and 10. The layer 8 is bonded through the electrically insulating layer 9 to the photocathode 1 and layer 10 is bonded through the insulating layer 11 to the first photoconductive layer 5 of the double layer in which the second photoconductive layer is represented by the element 20. The photoconductive layers 5 and 20 are spectrally sensitive each for a different wavelength range so that the exposure of the layer 5 with electromagnetic radiation of a particular wavelength range does not substantially increase the conductivity of the other layer 20. During the information-wise exposure of the photocathode 1 and the simultaneous ion generation by the corona device comprising the grounded corona shield 6 and the wires 21 connected to the positive pole of the high potential DC-source 22, no conductivity-increasing radiation impinges on the photoconductive layers 5 and 20. During the exposure of the photocathode 1 an electron-accelerating potential difference is applied between the electrode 19 and the conductive input opening layer 8 of the microchannel plate by means of the DC-voltage source 23. During this exposure a DC-potential difference is also applied by a potential source 7 between the conductive input and output electrode layers 8 and 10 of the microchannel plate 4.

The ion spray for the corona wires proceeds through a grid 24 that is kept with the DC-potential source 25 at a lower potential than the corona wires.

After the formation of the internal and external charge patterns, the corona apparatus (6,21) and the grid 24 are removed to allow the application of electrostatically attractable material to the surface of the photoconductive layer 20 carrying the external charge pattern. As the developing material, e.g. toner particles in an aerosol or insulating liquid, are contacted with the photoconductive layer 20, the photoconductive layer 5 is simultaneously overall exposed to conductivity-increasing electromagnetic radiation ($h\nu_1$) while the switch 26 is closed and connects the exposed layer to ground allowing the internal charge pattern to leak off.

The electromagnetic radiation ($h\nu_1$) is of such wavelength that only the conductivity of the photoconductive layer 5 is substantially increased. The electromagnetic radiation $h\nu_1$ is produced e.g. with a radiation source positioned in front of the layer 20 and provided with the necessary optical filter to have light of the desired wavelength pass through.

Following the development of the external charge pattern on the photoconductive layer 20, the image wise-deposited material is transferred by a technique known in the art to a receptor material, e.g. plain paper or resin film, and fixed thereon.

Residual charges of the external charge pattern are removed by overall irradiating the photoconductive layer 20 with electromagnetic radiation ($h\nu_2$) under the influence of which it becomes conductive and the residual charges can leak off to the ground through the switch 27 closed at that moment. After the initial dark-resistivity has been regained in the photoconductive layers 20 and 5 the apparatus is ready for a next imaging step.

The present invention include the use in the imaging apparatus of a combination of a photoconductive layer 5 and non-photoconductive insulating layer fixed thereto instead of a photoconductive insulating layer 20.

The neutralization of a residual charge pattern on the non-photoconductive insulating layer proceeds in that case with an alternating current corona discharge commonly known in the art.

The removal of the internal charge pattern from the target of the electron discharge image during the development of the external charge pattern is likewise advantageous when operating the imaging device represented in FIG. 4. According to one embodiment the latter imaging device is operated as described in connection with the accompanying FIG. 7. In that device the elements 1 to 11 and 19, 21, 22, 23 and 26 are the same and have the same function as described in connection with FIG. 6. During exposure of the photocathode 1 the photoconductive layer 5 (forming the top wall of the imaging envelope) is kept in intimate stationary contact with the insulating sheet material 18 during the exposure of the photocathode 1. The sheet material 18, e.g. an electrically insulating resin film web, is supplied from a supply reel (not shown in the drawing) and after development moved into a cutting device comprising, e.g., a movable knife and a stationary knife, to obtain the formed print on a transparent sheet that can be viewed or inspected with transmitted light like a common X-ray radiograph.

Figure 7:
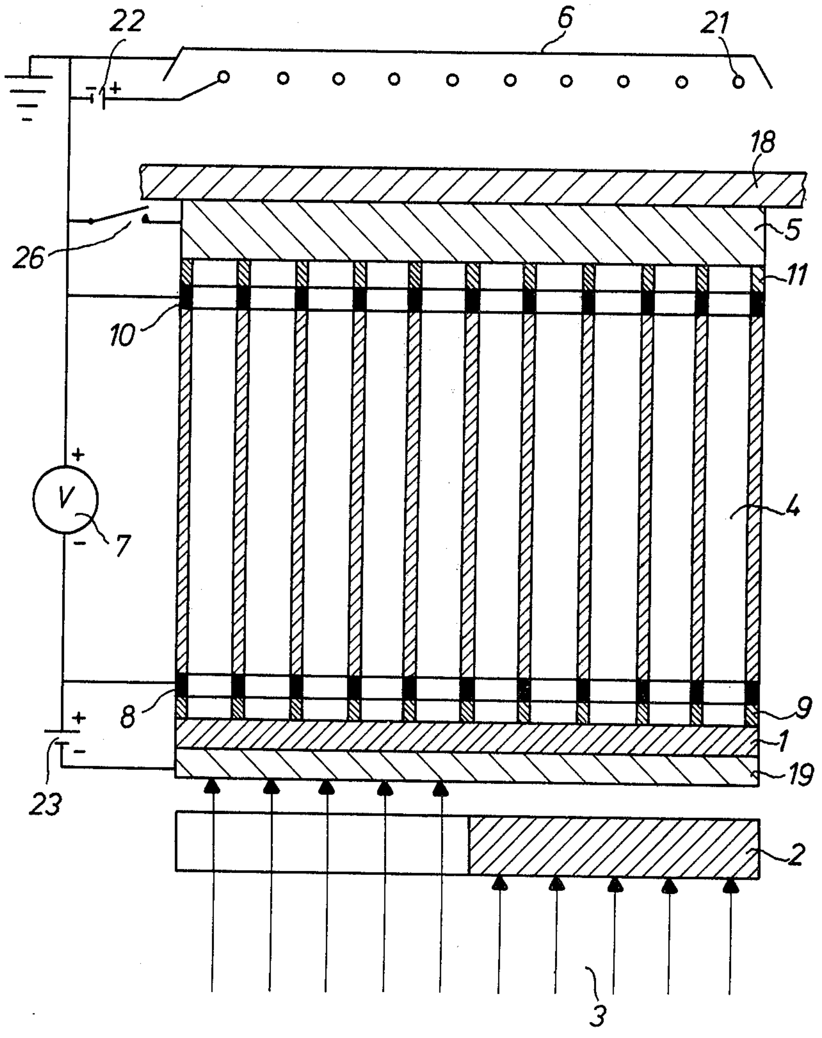

According to the embodiment represented in FIG. 7 direct contact of developer material with the photoconductive target wall 5 of the imaging device is excluded and consequently smudging of the imaging envelope with developer material can not take place.

The dielectric target material in the imaging envelope has preferably an electric resistivity of at least $10^{11}$ ohm.cm in the dark. Furthermore, it is preferably a highly polarizable medium in order to make it possible to built up a strong charge pattern. Indeed, a dielectric material with a high dielectric constant ($\epsilon_1$), preferably larger than 10, offers a larger capacity (C) so that a charge pattern of higher strength can be built up before reaching electrical break-down. This can be learned from the following equation:

$$C=\epsilon_1 \cdot \epsilon_0 \cdot \frac{S}{d}$$

wherein:

$\epsilon_1$ is the relative dielectric coefficient of the dielectric medium, $\epsilon_0$ is the electric vacuum space constant viz. $8.85 \times 10^{-12}$ newton per meter, $S$ is the surface area (m2) of the capacitor, and $d$ is the thickness (m) of the dielectric medium.

The charge (Q) that can be accumulated by the capacitor can be computed from the following equation:

$$Q = C \times V$$

wherein:

$V$ is the potential difference, expressed in volts, between both sides of the dielectric medium, $Q$ is expressed in coulomb, and $C$ is expressed in farad.

Bearing in mind the importance of the dielectric constant, preference is given to photoconductive layers containing highly polarizable substances, e.g. strontium titanate ($\epsilon_1 = 310$) and titanium dioxide (rutile) ($\epsilon_1 = 173$ or 86, depending on the direction of the crystal axis).

According to a preferred embodiment the dielectric member 5 is made of semi-conducting glass, e.g., so-called chalcogenide glass. Semiconducting glasses and their properties have been described, e.g., by B. T. Kolomiets, T. N. Manontova and T. F. Nazarova in "Electrical properties of chalcogenide glasses" (The Structure of Glass, Consultants Bureau, New York, 1960) pp. 418–422; B. T. Kolomiets, Vitreous semiconductors, Physica Status Solidi 7 (1964) 2, 7 (1964) 3; J. L. Hartke, P. Regensburger, Elektronische Zustaende in glasfoermigem Selen, Phys. Rev. (2) 139 (1965); B. T. Kolomiets, G. I. Stepanov, Impurity photoconductivity in single-crystalline and vitreous arsenic selenide, Fizika Tverdogo Tela 7 (1965) 9; L. J. Graham, R. Chang, Einige mechanische Eigenschaften von glasartigem Selen nahe dem Glasumwandlungsstadium, J. Appl. Phys. 36 (1965) 10; V. I. Kruglov et al., Photoconductivity of glass-like $As_2Se_3$, Vestnik Leningr. Univ.Fiz. & Khim (1966) no. 3; J. D. Mackenzie, Halbleitende Gläser, Umschau 67 (1967) 8; Yu. A. Chercasoy, I. Yurkan, Thermally stimulated conductivity of glassy selenium films, Fiz.Techn. Poluprovodnikov (USSR) 2 (1968) no. 7; Orlova G. M., Nikandrova G. A., Ostapenko L. V., Photoconductivity of vitreous $AsSe_x$ compositions, Izv.Akad.Nauk SSSR Neorg.Mater 4 (1968) (10); Ovshinsky S. R., 1968 Phys.Rev. Lett. 21, 1450; Sigeru Iizima, Electrical and thermal properties of semiconducting glasses As—Te—Ge, Solid State Communications 8 (1970) no. 3; Kruglov V. I., Strakhov L. P., Photosensitivity of a vitreous arsenic-selenium system, Fiz.Tekh.Poluprov. 4 (1970) (8); Namikawa, Glassy semiconductors, Kagaku Kogyo 21 (1970) (11); Ugai Ya A. et al., Semiconductor glasses in the $ZnAs_2$—$CdAs_2$-system, Izv.Akad. Nauk SSSR Neorg. Mater 6 (1970) (2); Böer K. W., Ideal semiconducting glasses, Physica Status Solidi 45 (1971) no. 2; Strickler D. W., Roy R., Neue Familie photoleitender glasartiger Oxidmaterialien, J.Mater.-Sci. 6 (1971) no. 3; Kolomiets B. T., Ruklyadev Yu. V., Shilo V. P., Effect of copper and silver on the conductivity and photoelectric properties of arsenic selenide glasses, J.Non-Cryst.Solids 5(1971) (5); Namikawa S., Glassy semiconductors, Kagaku Kogyo 22 (1971) (2); G. B. Thomas et al., The switching behaviour of thin films of chalcogenide glass, Royal Radar Establishment, Great Malvern, Worcestershire, U.K., 11 March 1972; and in the U.S. Pat. Nos. 2,930,999 of Johannes Gerrit van Santen and Hendrik, Jacobus Maria Joormann issued Mar. 29, 1960 and 3,397,982 of Richard L. Lane issued Aug. 20, 1968 as well as in the published German Patent Application Nos. 1,916,609 filed Apr. 1, 1969 by Varian Associates and 2,010,706 filed Mar. 6, 1970 by Matsushita Electric Ind. Comp.

The thickness of the dielectric member 5 serving as a part of the wall of the vacuum envelope is preferably in the range of 0.1 to 1 mm with the proviso that it must be sufficiently strong to withstand the external atmospheric pressure. The dielectric member 5 may be supported by the microchannel plate (see FIG. 2) or reinforced, e.g., with glass fibers or glass fiber fabric.

The material of the photocathode 1 may be any type of photo-electron-emitting substance or composition known in the art. For example, it may be directly sensitive to X-rays, visible light and/or ultraviolet or infrared radiation.

A non-limitative survey of photocathode material is given by H. Bruining in his book Physics and Applications of Secondary Electron Emission — Pergamon Press Ltd. — London (1954).

The secondary emissive electron multiplier device suited for the purpose of the present invention may be defined as a resistive matrix including narrow passages arranged in substantially parallel relationship to each other with the end openings constituting the input output faces of the matrix, and which are each coated with an electrically conductive layer, the conductive layer on the input face of the matrix serving as an input electrode, a separate conductive layer on the output face of the matrix serving as an output electrode, the distribution and cross-sections of the narrow passages (micro-channels) and the resistivity and the secondary-emissive properties of the matrix being such that the resolution and electron multiplication characteristic of any one channel unit area of the device is substantially similar to that of any other channel unit area in order to avoid image distortion.

In the operation of the channel electron multiplier device a suitable D.C.-potential difference, e.g. 0.5–5 kV, is applied between the electrode materials 8 and 10 so as to set up an electric field to accelerate the electrons (photo-electrons and secondary emission electrons), thereby establishing a potential gradient over and a current flowing through the electron-emissive material present on the inside surface of the channels or, if such channel inner coating is absent, through the bulk material of the matrix.

Secondary-emissive multiplication takes place in the channels and the output electrons may be acted upon by a further accelerating field, which may be set up between the dielectric material 5 and the output openings of the microchannels of the plate 4, and/or between the positive corona 6 and the output openings of the plate 4.

Between the photocathode and the plate input an electric field is preferably applied. When that field is so strong that the photoelectrons are travelling along straight lines, i.e. nearly parallel to the tube axis at the input, no multiplication or only poor multiplication takes place, for an insufficient number of collisions is produced. It is possible to correct for this by tilting the channels of the plate, e.g., at an angle in the range of 1° to at about 10° to the perpendicular on the photoelectron-emitting surface.

Secondary-emissive electron multiplier devices of the type of the plate used in the present invention are described e.g., in the United Kingdom Patent Specification Nos. 1,064,072, 1,064,073, 1,064,074, 1,064,075 as mentioned hereinbefore and 1,137,018 filed June 30, 1967 by Mullard Ltd. and in the Canadian Pat. Nos. 750,037 filed Mar. 31, 1964; 779,996 filed May 1, 1964 and 866,923 filed Mar. 26, 1968 all by Phillips Gloeilampenfabrieken.

The length-to-diameter ratio of the narrow passages or microchannels is preferably in the range of 100:1 to 50:1. The diameter of the channels determining the image resolution of the system preferably does not exceed 200 $\mu$m. Microchannels of 40 $\mu$m diameter are commercially available in the form of discs specified as channel electron multiplier plates G 40-25 and G 40-5 from Industrial Electronic Division, Mullard Ltd., Mullard House, Torrington Place, London, W.C. 1 E 7 HD.

If the channels do not have resistive inner surfaces, the bulk material of the matrix preferably has a resistivity in the range $10^9$–$10^{11}$ ohm.cm; the actual value is determined by the maximum output current that will be drawn from the device.

The manufacturing techniques for channel plates are quite similar to those used for fibre optics (see United Kingdom Pat. No. 1,064,072 as mentioned hereinbefore and KAPANY, N. S., "Fibre Optics: principles and applications", Academic Press, New York 1967).

Tubing of poorly conductive glass is drawn to the required diameter in one or more stages. Channels of already small diameter, e.g., 500 $\mu$m, are assembled whereupon the bundle is drawn down to the required size, e.g., 40 $\mu$m. When large plates are made, e.g., of 30 cm × 40 cm, the individual channels or multiple units (bundles) may be sticked or fused together to make up the required area. Small bundles are sliced, whereas large bundles are ground and/or polished to obtain the required area. The input and/or output area of the plate may be curved but in order to avoid image distortion the curvature should be the same for both window faces.

The inner surface of the thin glass tubes is preferably covered with a substance having secondary electron-emission properties (see Physics and Applications of Secondary Electron-Emission by H. Bruïning — Pergamon Press Ltd., London (1954) page 17).

In the J.Sci.Inst. (J.Phys.) 1969, Series 2, Vol. 2, pp. 825–828, channel electron multipliers have been described in which the inner surface of the glass tubes is coated with lead or vanadium oxide. The inner surface of the tubes is prepared before or after reaching the final diameter.

The individual electron multiplying channels are connected electrically in parallel by evaporating, e.g., a thin Nichrome film at an oblique angle onto the two open channel window faces of the plate, but leaving each multiplier channel itself open. A peripheral ring electrode may be pressed against each face of the plate in order to establish electric contact.

The open area of suitable plates is preferably not smaller than 60 percent.

The channels may contain some amount of gas molecules. In operation residual gas molecules near the output of the plate are accelerated back down the channels and may start additional cascades by striking the channel wall near the input. The incidence of ionic feedback depends on the residual gas pressure and the electron density. At sufficiently high pressures and electrical gains a self-sustaining discharge can occur; but should be avoided when operating with the microchannel plate. With pressures below $10^{-5}$ mm Hg channel electron-multiplier plates can be operated with gains in excess of $10^5$ without trouble, while at $10^{-3}$ mm Hg plates have been operated successfully with gains of several thousands (see Mullard Technical Communications No. 107, November 1970, p. 170–176).

The invention is not limited to any type of development of the externally obtained electrostatic charge pattern.

The development of the electrostatic charge image obtained on the outerside of the dielectric material may proceed with finely divided electrostatically attractable material that is preferably sufficiently non-transparent to visible light to give an opaque image.

According to a common technique the development proceeds by dusting the dielectric element bearing the electrostatic image with finely divided solid particles that are image-wise electrostatically attracted or repulsed so that a powder image in conformity with the charge density is obtained.

The expression "powder" denotes here any solid material e.g., finely divided in liquid or gaseous medium, that, can form a visible image in conformity with an electrostatic charge image.

Well-established methods of dry development of electrostatic latent images include cascade, powder-cloud (aerosol), magnetic brush, and fur-brush development. These are all based on the presentation of dry toner to the surface bearing the electrostatic image where coulomb-forces attract or repulse the toner so that, depending upon electric field configuration, it settles down, i.e., deposits, in the electrostatically charged or uncharged areas. The toner itself preferably carries a charge applied by triboelectricity.

The present invention, however, is not restricted to the use of dry toner. Indeed, it is equally possible to apply a liquid development process (electrophoretic development) according to which dispersed particles are deposited by electrophoresis from a liquid medium. In that case the dielectric recording element surface bearing the electrostatic charge pattern is preferably smooth (non-porous) and possesses only a weak adhesion for the electrophoretically deposited toner particles so that these particles before or after evaporation of the developing liquid can be transferred easily to a final support. Organic photoconductive recording layers or chalcogenide glasses are particularly suited for that purpose.

The electrophoretic toner may be any powder forming a suspension in an insulating liquid. The particles acquire a negative or positive charge when in contact with the liquid due to the zeta potential built up with respect to the liquid phase. The outstanding advantages of these liquid developers are the almost unipolarity of the dispersed particles and their appropriateness for very high resolution work when colloidal suspensions are applied.

Preferably a transferable toner is applied so that the powder deposit forming the developed image may be transferred from the support containing the electrostatic charge image to, e.g., a flexible support such as transparent film or paper. In the latter case, any known process for transferring powder image-wise from one support to another can be used; such powder transfer processes are well known in the art of electrophotography. If an electrostatically attractable powder is used the powder image can be transferred by electrostatic attraction, e.g., according to the method disclosed in the United Kingdom Pat. No. 658,699 filed Apr. 14, 1949 by Battelle Memorial Inst. Further details are contained in the U.S. Pat. Nos. 3,384,488 of Vsevolod Tulagin and Leonard M. Carreira issued May 21, 1968 and 3,565,614 of Leonard M. Carreira, Ira S. Stein and Vsevolod Tulagin issued Feb. 23, 1971. If a powder with ferromagnetic properties is used for developing the electrostatic latent image, the powder can be transferred by magnetic attraction. The transfer can likewise be carried out by adhesive pick-off with an adhesive tape or sheet, e.g., SCOTCH brand cellophane tape.

The final powder image is fixed, e.g., by heat or solvent treatment.

Suitable electrophoretic developers are described, e.g., in the U.S. Pat. No. 2,907,674 of Kenneth Archibald Metcalfe and Robert John Weight issued Oct. 6, 1959 and the United Kingdom Pat. No. 1,151,141 filed Feb. 4, 1966 by Gevaert-Agfa N.V.

The electrostatic image can likewise be developed according to the principles of wetting development as described, e.g., in the United Kingdom Pat. Nos. 987,766 filed Apr. 18, 1962 by Agfa A. G., 1,020,505 filed Nov. 8, 1961 and 1,020,503 filed Nov. 8, 1951 both by Gevaert Photo-Producten N.V.

According to a particular embodiment the charge pattern is developed in direct relation to the magnitude of the charge, instead of to the gradient of the charge (fringe effect development). Therefore the developer material is applied while a closely spaced conductor is situated parallel to the dielectric member 5. In that embodiment this conductor is connected electrically to the output electrode of the channel plate, e.g., through a source of electrical potential (see for such type of development e.g., PS&E, Vol. 5, 1961, p. 138).

The transferred charge pattern may be formed on any type of electrographic recording material e.g., a recording web consisting of an insulating coating of plastic on a paper base having sufficient conductivity to allow electric charges to flow from the backing electrode to the paper-plastic interface.

For a particular electrographic paper reference is made to the U.S. Pat. No. 3,620,831 of Floyd T. Could issued Nov. 16, 1971.

As substances particularly suited for enhancing the conductivity of the rear side of a transparent resin web or sheet can be mentioned antistatic agents preferably antistatic agents of the polyionic type, e.g., CALGON CONDUCTIVE POLYMER 261, a trade mark of Calgon Corporation, Inc. Pittsburgh, Pa., U.S.A. for a solution containing 39.1% by weight of active conductive solids, which contain a conductive polymer having recurring units of the following type:

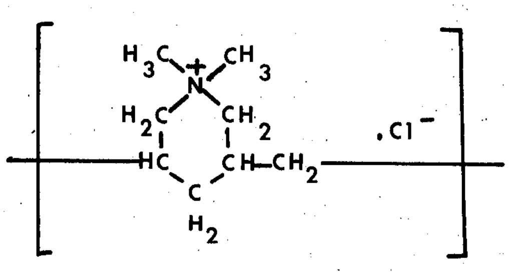

and vapour-deposited films of chromium of nickel-chromium about 3.5 μm thick which are transparent for about 65 to 70 % in the visible range.

Copper(I) iodide conducting films can be made by vacuum depositing copper on a relatively thick resin base and a subsequently treating with iodine vapour under controlled conditions (see J.Electrochem.Soc., 110–119, Feb. 1963). Such films are over 90 percent transparent and have surface resistivities as low as 1500 ohms per square unit area. The conducting film is preferably overcoated with a relatively thin insulating layer as described e.g., in the J.Soc.Motion Picture Television Engrs. Vol. 74, p. 667.

We claim:

1. A method of recording information as a pattern of electrostatic charges capable of xerographic development which comprises:

a. exposing to a pattern of electromagnetic radiation corresponding to said information a closed imaging chamber adapted to produce therein upon such exposure electrostatic charges of a given polarity in a pattern corresponding to such exposure, said chamber having a wall section thereof coextensive in area with the charge pattern formed therein constituted of dielectric material, b. electrically biasing said pattern of charges against the inner surface of said dielectric wall section, and c. concurrently with said radiation exposure, generating from a source exteriorly of said chamber a corona discharge opposite in polarity to the charges in said pattern and directing such discharge uniformly toward the exterior side of said dielectric wall section to produce adjacent said exterior side an array of corona generated charges modulated in density in a pattern according to the pattern of charges of opposite polarity present on the interior surface of said dielectric wall section.

2. The method of claim 1 including the step of developing said external charge pattern by contacting the same with electrostatically attractable developing material and concurrently discharging the internal pattern of charges from said interior dielectric wall surface.

3. The method of claim 1 including the step of interposing between said corona discharge source and said exterior dielectric wall surface an electrical field acting parallel to said dielectric wall section to reduce lateral diffusion of said corona discharge.

4. The method of claim 1 including the step of multiplying the number of charges in said pattern by means of a source of secondary charge emission disposed within said chamber and responsive to said pattern of primary charges.

5. The method of claim 1 including the step of arranging in contact with the exterior surface of said dielectric wall section a layer of insulating charge receiving material movable independently of said wall section, said layer receiving said corona discharge to form said modulated array of corona generated charges thereon, whereby said receiving material can be contacted with xerographic developing material to develop the charge thereon.

6. The method of claim 5 wherein said wall section is photoconductive and including the steps of developing said modulated charge array by contacting the exterior surface of said receiving material with xerographic developing material while the same is in contact with side dielectric wall section after termination of said corona discharge and concurrently with said developing step uniformly exposing said wall section to light to dissipate the internal charge pattern thereon.

7. An imaging system for reproducing information as an electrostatic charge pattern comprising:

a. a closed imaging chamber adapted when exposed to a radiation image of said information to produce therein a pattern of electrostatic charges of given polarity corresponding to said image, said chamber including a wall section constituted of dielectric material of an area coextensive with said radiation image;

b. means for exposing said imaging chamber to said radiation image; and c. means for biasing said pattern of charges against the internal surface of said dielectric wall section comprising 1. electrode means disposed in said chamber in spaced relation to said dielectric wall section and
2. a corona discharge source disposed exteriorly of said chamber in spaced relation to said dielectric wall section to direct uniformly toward the exterior surface of said wall section corona generated charges of polarity opposite to said internal charge pattern, said latter charges being modulated in density by said internal charge pattern and forming adjacent said exterior wall section surface a charge array in a pattern corresponding to said internal charge pattern.

8. The system of claim 7 wherein said chamber contains a photocathode for emitting said pattern of electrostatic charges upon exposure to activating radiation and means disposed between said photocathode and said dielectric wall section for multiplying the primary photocathode emitted charge pattern by emitting secondary charges in response to said primary charges.

9. An imaging system as in claim 8 wherein said secondary emission multiplier means comprises a plurality of electron-multiplying narrow passages arranged in substantially parallel relationship in a reduced pressure medium.

10. An imaging system according to claim 8, wherein the secondary emission multiplier is a resistive matrix including narrow passages arranged in substantially parallel relationship to each other and whose end openings constitute the input and output faces of the matrix and of which the two surfaces of said matrix where the passages open out are coated with an electrically conductive layer, the conductive layer on the input face of the matrix serving as an input electrode, a separate conductive layer on the output face of the matrix serving as an output electrode, the distribution and cross-sections of the narrow passages and the resistivity and the secondary-emissive properties of the matrix being such that the resolution and electron multiplication characteristic of any one channel unit area of the device is substantially similar to that of any other channel unit area.

11. An imaging system according to claim 10, wherein said input and output faces serving as electrodes have means for connection with a D.C.-potential source.

12. An imaging system according to claim 10, wherein one of the conductive layers is bonded through an electrically insulating layer to the photocathode and the other conductive layer is bonded through an electrically insulating layer to the dielectric material, and wherein said insulating layer do not block the openings of said passages.

13. An imaging system according to claim 10, wherein the photocathode emits photoelectrons when struck with X-rays.

14. An imaging system according to claim 10, wherein the length-to-diameter ratio of the passages is in the range of 100:1 to 50:1.

15. An imaging system according to claim 10, wherein the dielectric wall section material is photoconductive and has a resistivity of at least $10^{11}$ Ohm.cm in the dark.

16. An imaging system according to claim 15, wherein said dielectric wall section is a double layer of photoconductive materials having a different spectral sensitivity, whereby after formation of said external charge pattern, said internal charge pattern can be selectively dissipated by uniformly radiating said wall section with radiation to which only the innermost of said double layer is sensitive.

* * * * *